United States Patent
Joe et al.

(10) Patent No.: US 8,439,639 B2
(45) Date of Patent: May 14, 2013

(54) FILTER SYSTEM FOR BLADE OUTER AIR SEAL

(75) Inventors: Christopher R. Joe, Wethersfield, CT (US); Eric A. Hudson, Harwinton, CT (US); Keith A. Santeler, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 1635 days.

(21) Appl. No.: 12/036,267

(22) Filed: Feb. 24, 2008

(65) Prior Publication Data

US 2009/0214329 A1    Aug. 27, 2009

(51) Int. Cl.
*F01D 5/08* (2006.01)
(52) U.S. Cl.
USPC .................. 416/97 R; 415/115; 415/121.1
(58) Field of Classification Search .............. 415/1, 115, 415/116, 121.2, 173.1, 173.3, 121.1, 170.1; 95/273
See application file for complete search history.

(56) References Cited

U.S. PATENT DOCUMENTS

| | | | | |
|---|---|---|---|---|
| 4,303,371 A | * | 12/1981 | Eckert | 415/116 |
| 4,551,064 A | * | 11/1985 | Pask | 415/116 |
| 5,092,735 A | * | 3/1992 | Katy et al. | 415/115 |
| 5,480,281 A | * | 1/1996 | Correia | 415/115 |
| 5,639,210 A | | 6/1997 | Carpenter et al. | |
| 5,791,871 A | | 8/1998 | Sech et al. | |
| 5,964,575 A | * | 10/1999 | Marey | 415/115 |
| 6,079,944 A | | 6/2000 | Tomita et al. | |
| 6,126,389 A | * | 10/2000 | Burdgick | 415/115 |
| 6,139,257 A | * | 10/2000 | Proctor et al. | 415/115 |
| 6,179,560 B1 | | 1/2001 | Kouris et al. | |
| 6,431,825 B1 | | 8/2002 | McLean | |
| 6,508,623 B1 | * | 1/2003 | Shiozaki et al. | 415/173.1 |
| 6,612,809 B2 | | 9/2003 | Czachor et al. | |
| 6,722,850 B2 | | 4/2004 | Burdgick | |
| 6,733,234 B2 | | 5/2004 | Paprotna et al. | |
| 6,883,807 B2 | | 4/2005 | Smed | |
| 6,997,673 B2 | | 2/2006 | Morris et al. | |
| 7,063,503 B2 | | 6/2006 | Meisels | |
| 7,070,387 B2 | | 7/2006 | Crozet et al. | |
| 7,553,128 B2 | * | 6/2009 | Abdel-Messeh et al. | 415/173.1 |
| 7,597,533 B1 | * | 10/2009 | Liang | 415/116 |
| 7,665,962 B1 | * | 2/2010 | Liang | 415/173.1 |
| 7,670,108 B2 | * | 3/2010 | Liang | 415/173.1 |
| 7,704,039 B1 | * | 4/2010 | Liang | 415/116 |
| 2004/0047725 A1 | | 3/2004 | Tomita | |
| 2008/0211192 A1 | * | 9/2008 | Pietraszkiewicz et al. | 277/347 |
| 2009/0067994 A1 | * | 3/2009 | Pietraszkiewicz et al. | 415/173.1 |
| 2009/0214329 A1 | * | 8/2009 | Joe et al. | 415/121.2 |

FOREIGN PATENT DOCUMENTS

| | | |
|---|---|---|
| EP | 0893577 | 1/1999 |
| EP | 1533478 | 5/2005 |
| EP | 1887191 | 2/2008 |

OTHER PUBLICATIONS

European Search Report, EP Application No. 08 25 3964, dated May 2, 2012.

* cited by examiner

*Primary Examiner* — Igor Kershteyn
*Assistant Examiner* — Christopher R Legendre
(74) *Attorney, Agent, or Firm* — Carlson, Gaskey & Olds PC

(57) ABSTRACT

A gas turbine engine component having a filter mounted adjacent an impingement cavity to filter particles out of a secondary cooling airflow outboard of a cooling channel in communication with the secondary cooling airflow.

7 Claims, 4 Drawing Sheets

FILTER SYSTEM FOR BLADE OUTER AIR SEAL

STATEMENT REGARDING FEDERALLY SPONSORED RESEARCH OR DEVELOPMENT

This invention was made with Government support under F33615-03-D-2354/0002 awarded by The United States Air Force. The Government has certain rights in this invention.

BACKGROUND

The present invention relates to a gas turbine engine and more particularly to a vane and blade outer air seal (BOAS).

Gas turbine engines generally include fan, compressor, combustor and turbine sections positioned along an axial centerline often referred to as the engine axis of rotation. The fan, compressor, and turbine sections each include a series of stator and rotor blade assemblies. An array of blades and an axially adjacent array of vanes are referred to as a stage.

Each stator assembly, which does not rotate (but may have variable pitch vanes), increase the efficiency of the engine by guiding core gas flow into or out of the rotor assemblies. Each rotor blade assembly includes a multiple of blades extending outwardly from the circumference of a disk. Platforms extend laterally outward from each blade and collectively form an inner radial flowpath boundary for core gas passing through the rotor assembly.

An outer case, including a multiple of blade outer air seals (BOAS), provides an outer radial flow path boundary. A multiple of BOAS are typically provided to accommodate thermal and dynamic variation typical in a high pressure turbine (HPT) section of the gas turbine engine. The BOAS are subjected to relatively high temperatures and receive a secondary cooling airflow for temperature control. The secondary cooling airflow is communicated into the BOAS then through annular cooling channels within the BOAS. The annular cooling channels have been reduced in size and increased in numbers so as to increase the secondary cooling airflow efficiency.

Disadvantageously, these relatively small internal passageways may become plugged with particulate in the secondary cooling airflow. Conventional HPT BOAS particulate plugging mitigation is either nonexistent or is manifested as particulate entrapment features in the secondary flow system upstream of the BOAS. Either technique may be less than effective with these relatively small internal passageways.

SUMMARY

A gas turbine engine component according to an exemplary aspect of the present invention includes a blade outer air seal having an impingement cavity; and a filter mounted adjacent the impingement cavity.

A method of filtering a secondary cooling airflow within a gas turbine engine according to an exemplary aspect of the present invention includes filtering particles out of a secondary cooling airflow outboard of a cooling channel in communication with the secondary cooling airflow.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows.

DETAILED DESCRIPTION OF THE DISCLOSED EMBODIMENT

Figure 1:
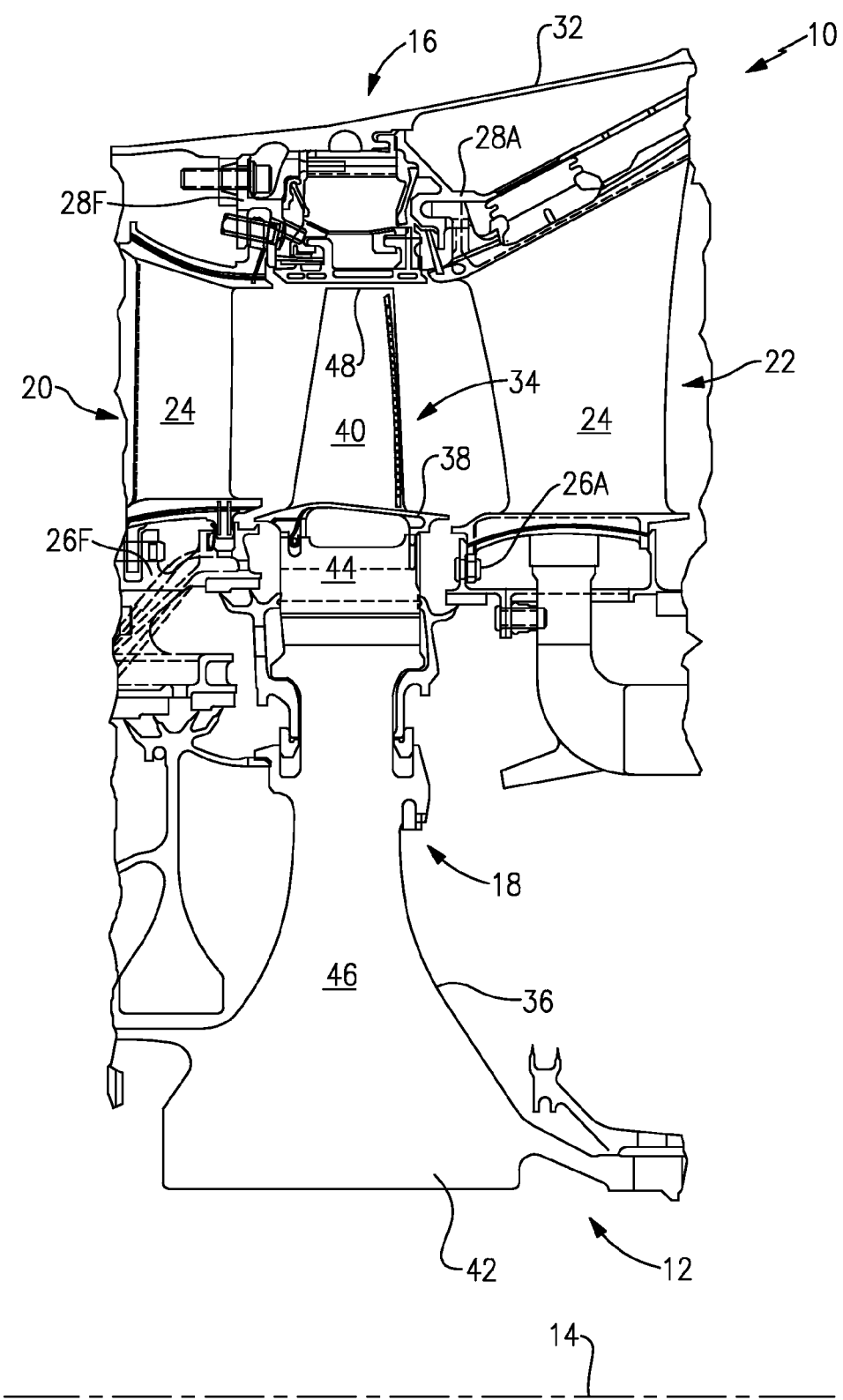
FIG. 1 is a general sectional diagrammatic view of a gas turbine engine HPT section.

FIG. 1 schematically illustrates a gas turbine engine 10 (illustrated partially here as a High Pressure Turbine HPT section) having a turbine 12 disposed along a common engine longitudinal axis 14. The illustrated embodiment provides an air seal for high pressure turbine (HPT) blade outer air seal (BOAS) assemblies, also often known as turbine shroud assemblies. It should be understood that although a BOAS for a HPT is disclosed in the illustrated embodiment, the filter arrangement may be utilized in any section of a gas turbine engine. The BOAS may find beneficial use in many industries including aerospace, industrial, electricity generation, naval propulsion, pumping sets for gas and oil transmission, aircraft propulsion, vehicle engines, and stationary power plants.

The engine 10 includes a BOAS assembly 16 for sealing within the turbine 12. The turbine 12 includes a rotor assembly 18 disposed between forward 20 and aft 22 stationary vane assemblies. Each vane assembly 20, 22 includes a plurality of vanes 24 circumferentially disposed around a respective inner vane support 26F, 26A. The vanes 24 of each assembly 20, 22 extend between the inner vane support 26F, 26A and an outer vane support 28F, 28A. The outer vane supports 28F, 28A are attached to an engine case 32.

The rotor assembly 18 includes a plurality of blades 34 circumferentially disposed around a disk 36, each blade 34 including a root 38 and an airfoil 40. The disk 36 includes a hub 42 and a rim 44, and a web 46 extending therebetween. The roots 38 are received within the rim 44 of the disk 36 and the airfoils 40 extend radially outward. The outer edge of each airfoil 40 may be referred to as the blade tip 48.

Figure 2A:
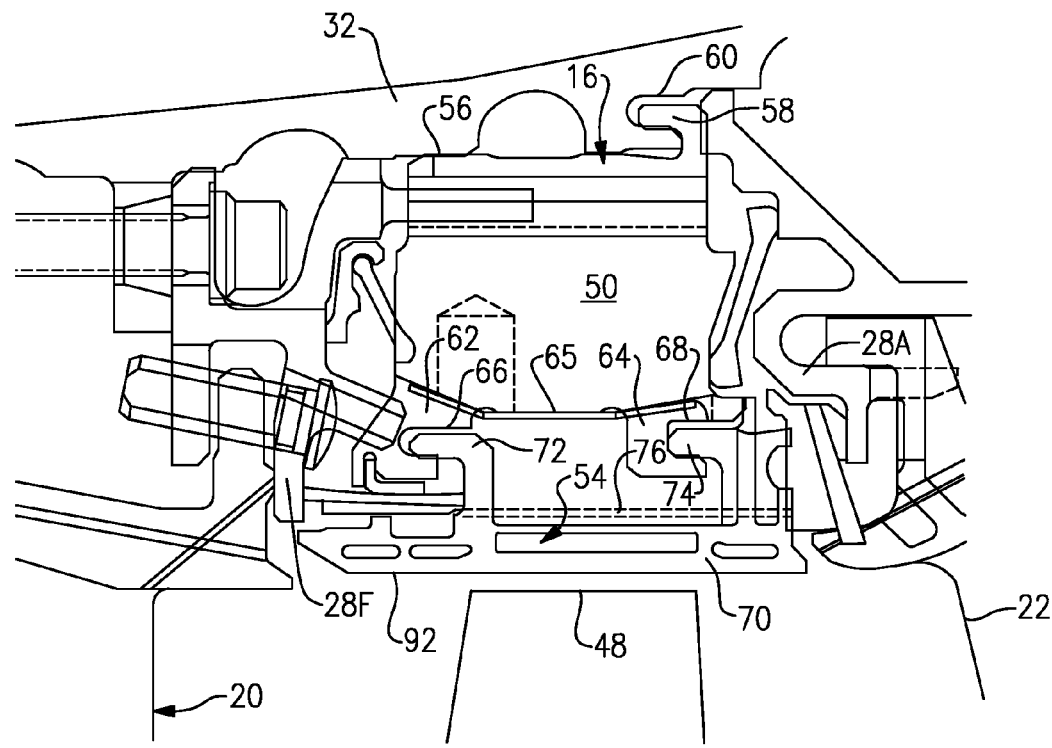
FIG. 2A is an expanded sectional view of a blade outer air seal (BOAS) assembly in the HPT section of FIG. 1.
Figure 2B:
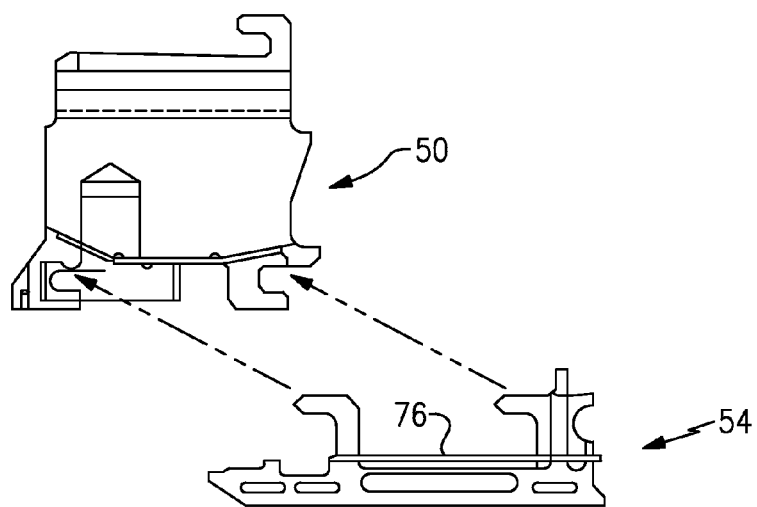
FIG. 2B is an expanded sectional view illustrating assembly of BOAS to a BOAS support of a BOAS assembly.

Referring to FIG. 2A, the BOAS assembly 16 is disposed in an annulus radially between the engine case 32 and the blade tips 48 of the rotor assembly 18, and axially between the forward 28F and aft 28A outer vane supports. Locating the BOAS assembly 16 between the forward 28F and aft 28A outer vane supports minimizes or eliminates loading on the BOAS assembly 16 from either vane assembly 20, 22. The BOAS assembly 16 includes a blade outer air seal (BOAS) support 50 and a multiple of blade outer air seals (BOAS) 54 mountable thereto (FIG. 2B). It should be understood that the BOAS support 50 may be a hoop or manufactured from individual segments. The BOAS support 50 is fixed within the engine case 32 by a press fit between an outer radial BOAS surface 56 and the engine case 32. A support attachment flange 58 further secures the BOAS support 50 with a receipt slot 60 within the engine case 32.

The BOAS support 50 includes a multiple of forward flanges 62 and aft flanges 64 which extend from an inner radial surface 65 thereof. The flanges 62, 64 are shaped such that they form a sideways "U" shaped slot 66, 68 with the opening thereof facing generally aft to receive the BOAS 54 in a generally upward and forward direction (FIG. 2B).

The BOAS 54 includes a body 70 which defines a forward flange 72 and an aft flange 74. The forward flange 72 and the aft flange 74 respectively engage the slots 66, 68 in the BOAS support 50 (FIG. 2B). The forward flange 72 and the aft flange 74 are assembled radially outward and forward to engage the slots 66, 68 and secure each individual BOAS 54 thereto. The forward flanges 62 and aft flanges 64 are circumferentially segmented to receive the BOAS 54 in a circumferentially rotated locking arrangement as generally understood.

A relatively small intervening gap between each adjacent BOAS 54 facilitates thermal and dynamic relative movement. A featherseal 76 is typically engaged between each two adjacent BOAS 54 to close the gap and thereby minimize leakage therebetween to increase the engine operating efficiency.

Figure 3A:
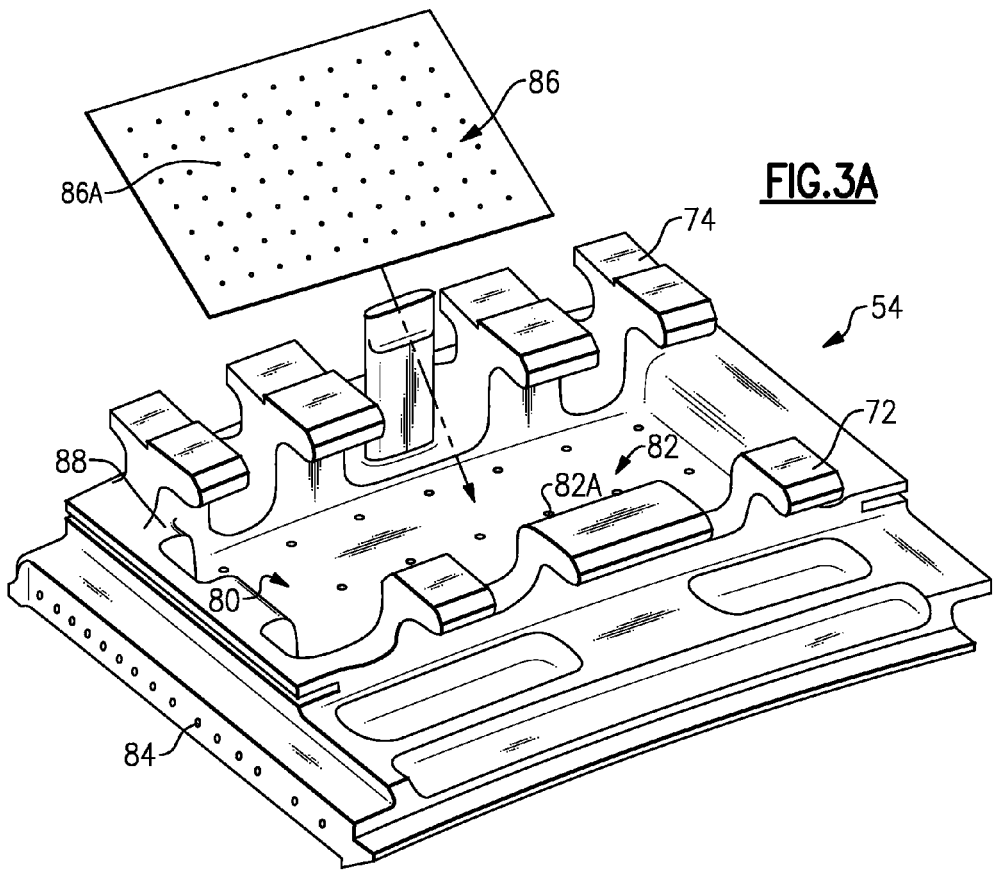
FIG. 3A is an exploded view of a BOAS.

Referring to FIG. 3A, the BOAS 54 includes an impingement cavity 80 generally between the forward flange 72 and the aft flange 74. The impingement cavity 80 includes an inlet area 82 having a multiple of inlets 82A which communicate with a multitude of annular cooling channels 84 to receive a secondary cooling airflow. The multitude of annular cooling channels 84 may be formed through an investment casting process.

Figure 3B:
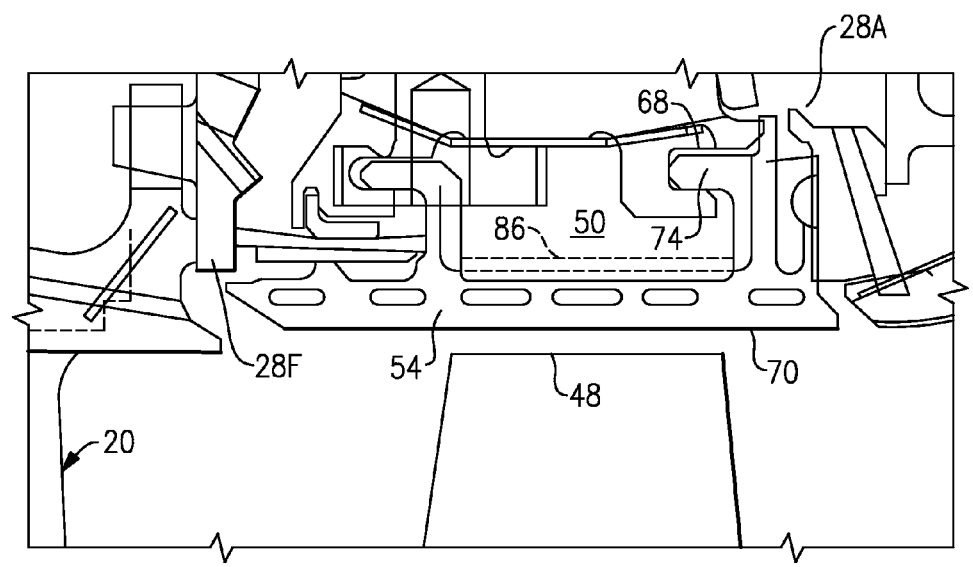
FIG. 3B is a sectional view of the BOAS illustrated in FIG. 3A.

A filter 86 is located within the impingement cavity 80 over the multitude of inlets 82A (FIG. 3B) to filter particulate-laden secondary cooling airflow immediately prior to being received within the multitude of annular cooling channels 84. The filter 86 may be situated just radially outboard of the inlet area 82 within the BOAS impingement cavity 80. The filter 86, in one non-limiting embodiment, may be manufactured of a finely perforated plate of a typical turbine case Nickel alloy such as INCONEL 625, where the perforated area is significantly larger than the BOAS cooling channel inlet area 82, so as to not meter the secondary cooling airflow and be relatively tolerant to particulate buildup in the filter 86.

Figure 4:
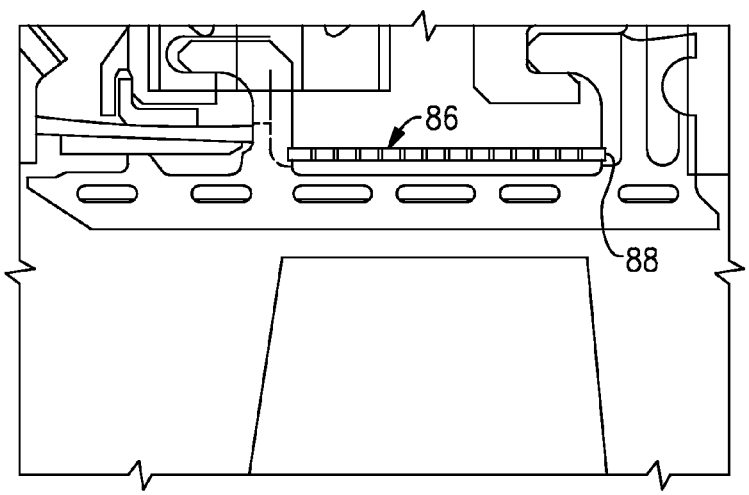
FIG. 4 is a sectional view of a BOAS illustrating one non-limiting embodiment of a filter.
Figure 5:
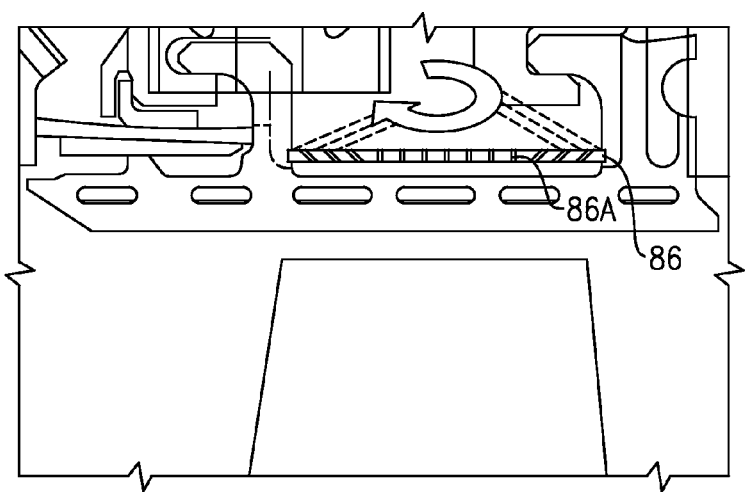
FIG. 5 is a sectional view of a BOAS illustrating another non-limiting embodiment of a filter.

The filter 86 may be welded, or mechanically attached via a slot fitting 88 (FIG. 4). The filter 86 is amenable to inspection and replacement at standard service intervals. Moreover, the placement of the apertures 86A in the filter 86 may be placed strategically to discourage the passage of particles through the filter 86 by orientation of the apertures 86A away from the momentum of relatively larger particles that depart from the secondary cooling airflow in the OD BOAS secondary flow cavity (FIG. 5). That is, the filter apertures 86A may be non-perpendicular to the filter 86. The filter apertures 86A may thereby be oriented to offset incoming particle trajectory.

Figure 6:
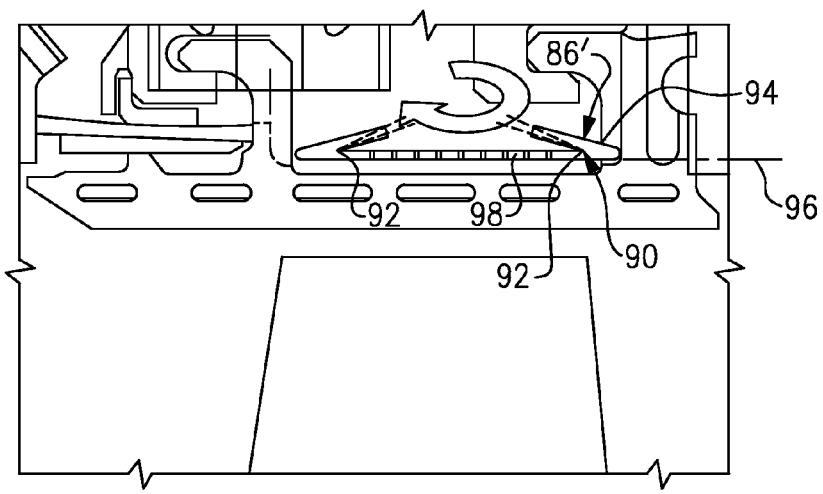
FIG. 6 is a sectional view of a BOAS illustrating another non-limiting embodiment of a filter.

Referring to FIG. 6, another non-limiting embodiment of a filter 86' is provided. The filter 86' includes a particle entrapment feature 90 to collect particulates along an edge 92 of the filter 86' The particle entrapment feature 90 in one non-limiting embodiment may include segments 94 which extend at an angle relative to a plane 96 defined by a filter plate 98 of the filter 86' to collect particulate in areas known through field experience.

By filtering particles out of the secondary cooling airflow immediately outboard of the cooling channels, an integral solution to plugging mitigation is provided through constraint on particle entry size via sizing the filter apertures 86A.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gas turbine engine component comprising:
   a blade outer air seal having an impingement cavity providing cooling holes; and
   a filter mounted adjacent said impingement cavity, said filter defines a multitude of filter apertures therethrough, at least one of said multitude of filter apertures perpendicular to a plane defined by said filter and at least one of said multitude of filter apertures non-perpendicular to said plane, wherein said cooling holes meter flow relative to said multitude of filter apertures, wherein the impingement cavity meters flow relative to said filter.

2. The component as recited in claim 1, wherein said filter is generally planar.

3. The component as recited in claim 1, wherein said filter is welded to said blade outer air seal.

4. The component as recited in claim 1, wherein said filter is removably mounted to said blade outer air seal.

5. The component as recited in claim 1, wherein said impingement cavity includes a multitude of inlets which communicate with a multitude of cooling channels.

6. The component as recited in claim 1, wherein said at least one of said multitude of filter apertures non-perpendicular to said plane defined by said filter is defined along an edge of said filter.

7. The component as recited in claim 1, wherein a perforated area of said filter is greater than an inlet area to cooling channels of said blade outer air seal.

* * * * *